Sept. 8, 1964 W. VEITH ET AL 3,148,304

SINGLE-BEAM COLOR PICTURE TUBE EMPLOYING VENETIAN BLIND DEFLECTION GRID

Filed Dec. 5, 1960 4 Sheets-Sheet 2

Inventors.
Werner Veith,
Hannsjörg Bittorf, &
Hinrich Heynisch.
By [signature] Atty.

United States Patent Office 3,148,304
Patented Sept. 8, 1964

3,148,304

SINGLE-BEAM COLOR PICTURE TUBE EMPLOYING VENETIAN BLIND DEFLECTION GRID

Werner Veith and Hannsjörg Bittorf, both of Munich, and Hinrich Heynisch, Grafelfing, near Munich, Germany, assignors to Siemens & Halske Aktiengesellschaft Berlin and Munich, a German corporation Filed Dec. 5, 1960, Ser. No. 73,713
Claims priority, application Germany Jan. 8, 1960
13 Claims. (Cl. 315—25)

Figure 1:
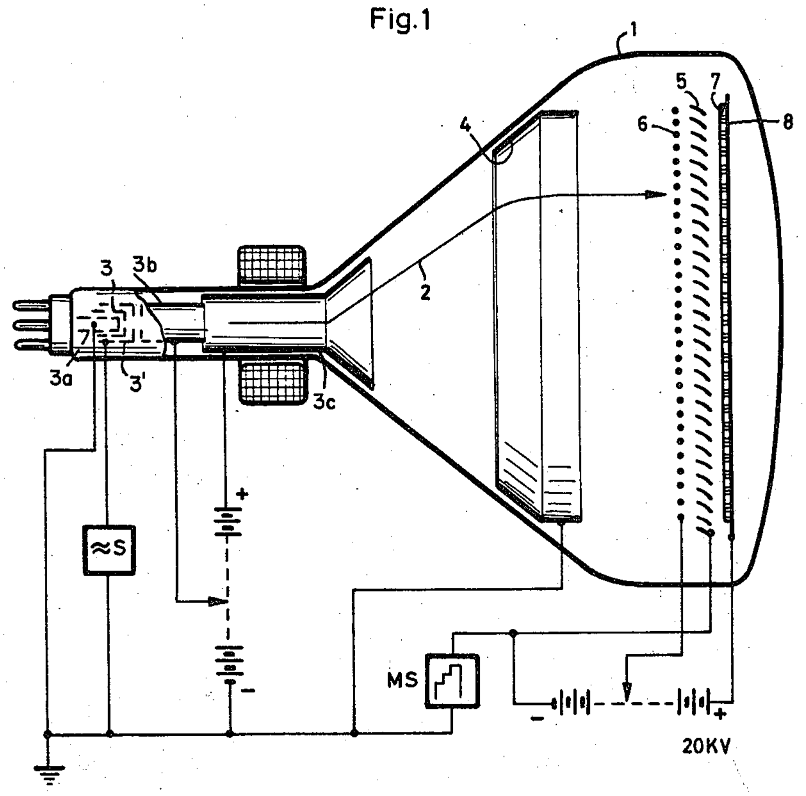

The invention disclosed herein is concerned with a single-beam electron radiation tube for reproducing television pictures, comprising focusing and deflection means such as are customarily used in connection with monochrome picture tubes, having, interalia, disposed in an evacuated tube stem, a system for producing an electron beam which is controllable (modulatable) as to intensity, and having a picture screen which is placed on high voltage and provided with at least two substances adapted to luminesce in different colors responsive to electron impact, said substances being disposed in discrete regularly distributed areas representing respectively elementary groups, further having two grids extending practically in parallel spaced from the picture screen and ahead thereof, and comprising means which effect perpendicular entry of the electrons into the grid plane and therewith slowing down thereof to easily controlled slow electons which are at the screen side by the acceleration field of the screen electrode deflected from their paths and at the same time focused so that they are, by the action of means which effects periodically the acceleration thereof (color selection means) successively pictured upon the individual areas of different colors of the respective elementary groups.

Electron radiation tubes have already become known which are adapted for the reproduction of color television pictures without the use of filters and optical systems, and wherein two or more monochromatic pictures are combined upon a screen to form a color picture. The common feature in connection with such tubes resides in a picture screen upon which two or more luminescent substances are provided in discrete regularly arranged areas, such substances being responsive to electron impact caused to luminesce in different colors. Electron tubes of this kind make it possible to excite the different color areas of the picture screen each independent of the other.

The construction of such tubes varies greatly and is in some instances very complicated, especially in the case of tubes using several electron radiation systems. The most difficult problem in the construction of such color picture tubes has however to do with the question of accuracy with which the individual color dots belonging to a picture point are over the entire picture area hit by the electron beams respectively allotted thereto.

Various solutions have been sought and applied in connection with color picture tubes operating with only one beam, as representing a tube type of simpler construction and simpler mode of operation. For example, U.S. Patent No. 2,619,608 describes a single-beam color picture tube in which are arranged, directly ahead of a plane screen electrode, two mutually separated plane electrodes having regularly distributed holes formed therein, and wherein a perpendicular entry of the electrons into the grid plane is effected by appropriate application of potentials. Of these three electrodes the central one, the so called lens electrode, has as compared with the other two electrodes a considerably lower potential, about ±10 volts with respect to the cathode of the beam producing system, such central electrode having regularly arranged circular holes formed therein to which are respectively allotted rings of luminescent substance of different diameter and color, arranged upon the screen electrode, while the first electrode, which is disposed ahead thereof, is provided with corresponding circular holes (formed by small circular plates held by narrow webs within a correspondingly larger circular opening) which are likewise coordinated therewith. The full electron beam which impacts the first electrode is deformed approximately to a hollow beam which, upon passing the central perforated lens electrode and thereby more or less overlapping, depending upon the lens potential, reaches the color rings of different diameter.

The realization of this known arrangement causes considerable technical production difficulties. It is, aside from the difficulties attending the production of the individual electrodes with the very small circular holes of a diameter smaller than that of the electron beam diameter, as well as the difficulties attending the production of the screen electrode with the vary-color luminescent rings of different diameter, particularly and extraordinarily difficult to adjust these three electrodes, with the holes of electron beam diameter allotted thereto, in two dimensions, while at the same time maintaining exact spacing between the electrodes. Another disadvantage resides in the fact that the respective elementary groups of the picture screen do not represent a continuous but a closed system so that mechanical adjusting errors cannot be compensated by any electrical correction.

The object of the invention is to avoid the drawbacks of the known arrangement by the provision of practically only one grid of considerably simpler structure, which has to be adjusted for the uniform division of the elementary groups, for substantially effecting the picturing of the electron beam upon individual color strips. Moreover, avoidance of aberration errors, which is in known manner done by shutter means disposed ahead of the lens electrode, is effected solely by a positive potential placed on the grid electrode (lens electrode).

In accordance with the invention, this is achieved, in connection with the initially indicated color picture tube with two grid electrodes disposed ahead of the picture screen, by the use of a second grid made in the form of a Venetian blind, arranged directly ahead of the screen electrode and comprising a plurality of elongated metal strips disposed approximately parallel to the picture screen plane, with the strips spaced according to a grid constant (pitch) which is equal or smaller than the electron beam diameter, the metal strips being blade-like arched or once or several times bent so as to retain clearance therebetween in the direction of the tube axis, and by forming on the metal backed luminescent screen (screen electrode) the areas of the respective elementary groups in the manner of strips extending in parallel with the respective metal strips of the Venetian blind grid, and making the division of the first grid, which serves practically alone for the perpendicular entry of the electrons into the grid plane, independent of the second grid as well as of the arrangement of the elementary groups, whereby such first grid may even be of irregular structure, for example, the structure of any desired mesh grid.

It is already known to arrange in a single-beam masking picture tube, ahead of the openings of the masking electrode, angularly positioned metal strips so that any direct clearance in the direction of the tube axis is blocked. However, contrary to the above described tube, this known tube does not utilize any slowed down electrons for the picturing, but only secondary electrons which are solely released at the side facing away from the screen electrode and which are more or less well focused to the picture screen by the permeating acceleration field so as to excite at the picture screen according to their impact velocity, at a quasi homogeneous luminescent substance, always at one and the same point, necessarily different colors. The very considerable disadvantages of this known arrangement is, among others, that the control of the different colors requires, in view of the necessary high frequencies, changes by several thousand volts of the potentials of large area electrodes.

Further details of the invention will be brought out in the following description which will be rendered below with reference to the accompanying drawings, such drawings being limited to essentials, that is, parts which are known from customary picture tubes being either omitted or indicated without applying reference numerals.

Figure 2:
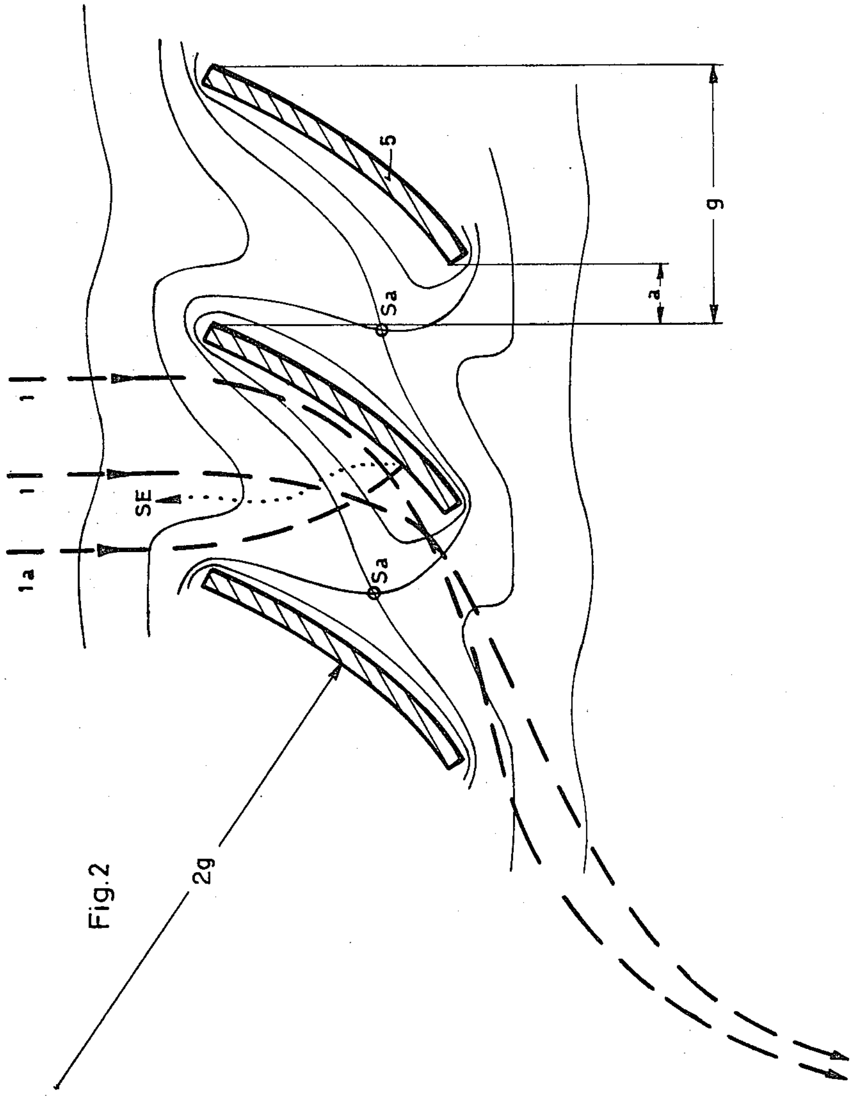
Figure 5:
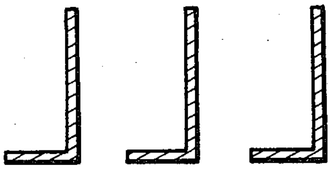
Figure 6:
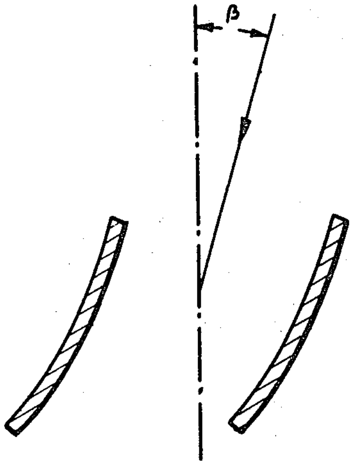
Figure 7:
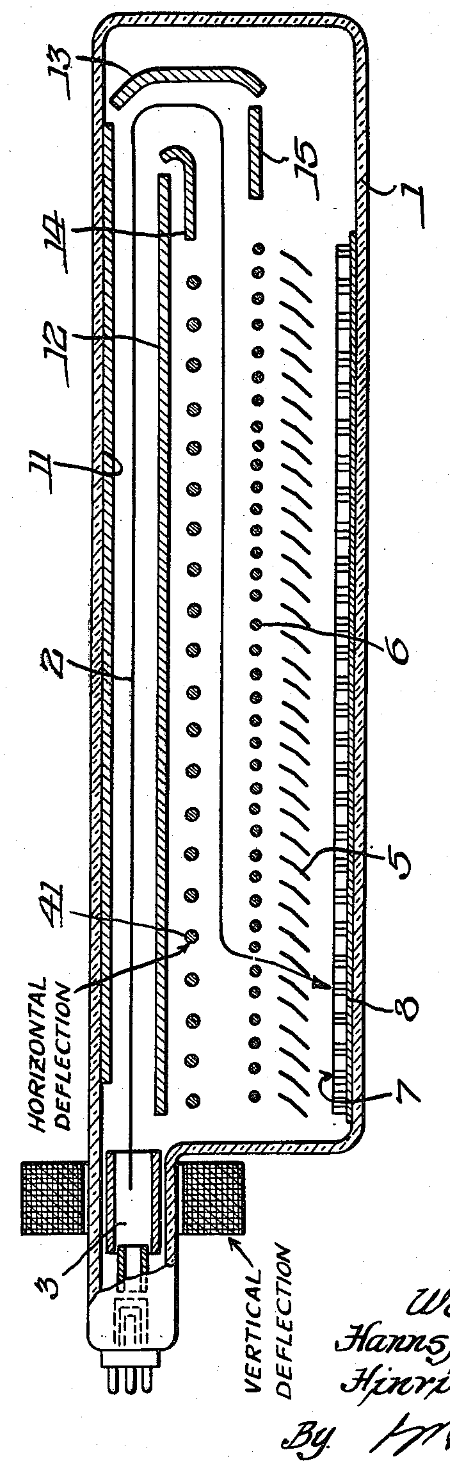
Figure 1:
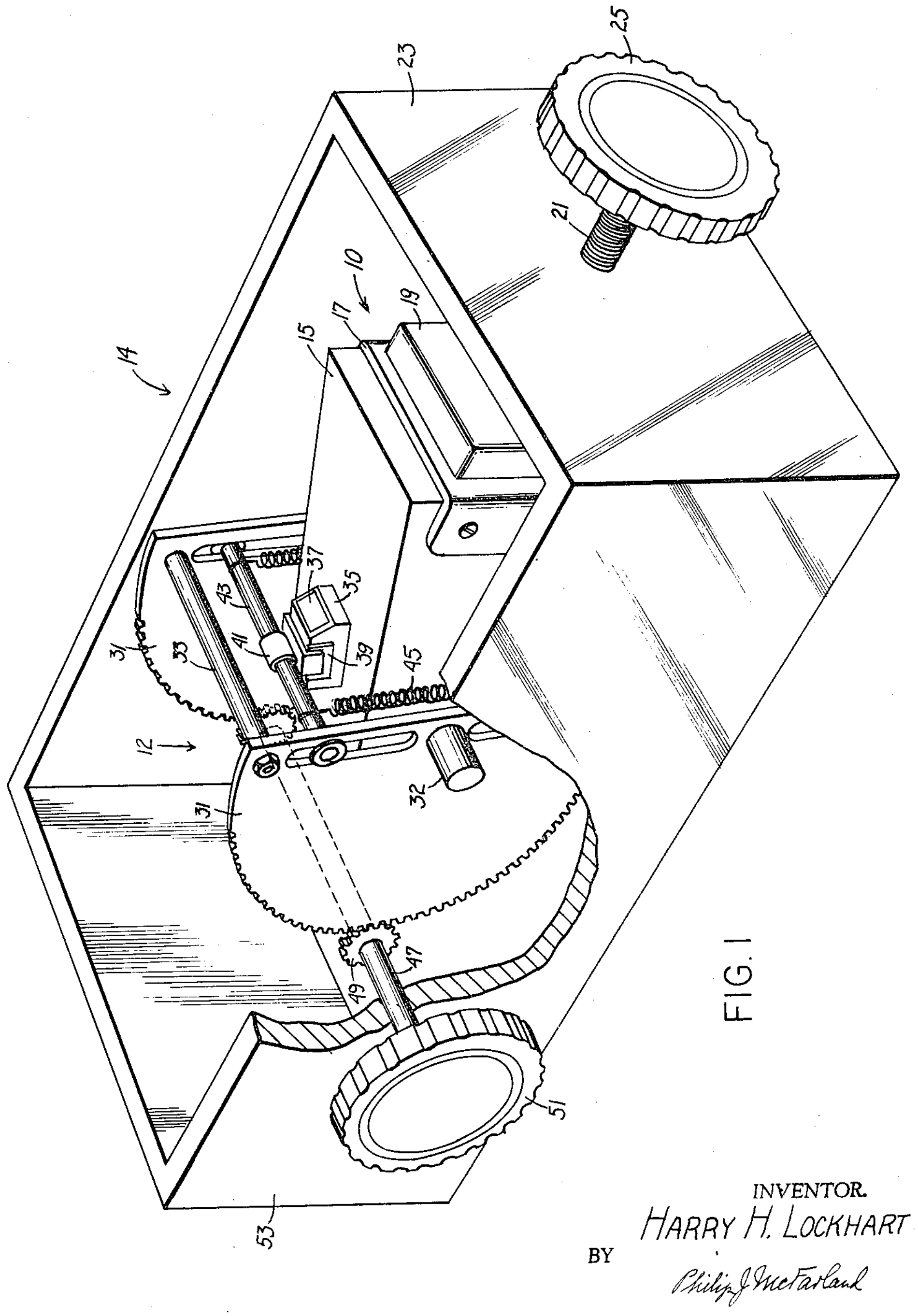

FIG. 1 shows a single-beam color picture tube, indicating also the beam course and the necessary circuitry;

FIG. 2 explains above all the action principle to be considered in connection with the Venetian blind grid;

FIGS. 3 to 6 illustrate different advantageous forms of the metal strips of the Venetian blind grid; and FIG. 7 illustrates, in horizontal section, a flat picture tube embodying the invention.

In FIG. 1, numeral 1 indicates the discharge vessel and numeral 2 the course of the electron beam. The electron beam is in usual manner produced by a generating system comprising, among others, a cathode *3a*, one or more control electrodes 3, 3' (Wehnelt cylinders) and a first acceleration anode *3b*, the beam being accelerated and focused by suitable means. The electron beam 2 is, for example, by means of a magnetic deflection device arranged at the transition from the tube stem to the tube cone, at the level of the second acceleration anode *3c* deflected so as to describe, for example, a rectangular pattern in a plane extending approximately in parallel to the tube base (window). However, the beam is, by means of a further approximately cylindrical deflection electrode 4 in cooperation with the second acceleration electrode *3c* of the beam generating system, slowed down, focused and bent in a direction extending perpendicularly to the picture screen pane, so that it enters approximately perpendicularly into the plane of the first potential plane grid 6 and thereafter the Venetian blind grid 5 made of arched or bent elongated metal strips. The potential plane grid 6 thus insures such perpendicular entry of the beam by smoothing (planing) the potential areas ahead of the Venetian blind grid, since there is on the Venetian blind grid a weak positive potential with respect to the potential of the cathode (or generating system), the grid 6 being made in the form of a simple normal grid, for example, in the form of a mesh grid, with a division (pitch) which is completely independent of that of the Venetian blind grid 5. Its spacing from the Venetian blind grid is smaller than or equal to the spacing of the screen electrode 8, 7 from the Venetian blind grid and may amount to about 50 grid constants.

The picture screen (screen electrode 8, 7) has a translucent conductive backing 8 upon which are provided the elementary groups 7 consisting of individual color strips. Since there is on each side of the Venetian blind grid, ahead and in back thereof, an electrode with a high positive potential, the individual gaps between the respective metal strips of the Venetian blind grid will form individual lenses with a strong transverse component, so that the entering electron beam is by the acceleration field of the screen electrode 8, 7 and by its acceleration, laterally deflected and at the same time focused. The amount of the lateral deflection is thereby determined substantially solely by the potential of the Venetian blind grid, an alteration of the deflection being effected by alteration of this potential. Since there would be occasioned a considerable idling load incident to this potential variation by about 50 volts per color change, due to the extensive dimensions and the slight spacng of the slats or strips of the Venetian blind grid from the neighboring electrodes, the required color selection voltage MS is in particularly advantageous manner placed in common on the three electrodes referred to, namely, on the first grid 6, second grid 5 and the screen electrode 8, 7. It is however also possible to effect the influencing of the electrons by the color selection voltage already in the electron beam generating system, by placing the color selection voltage in common on the cathode, the control electrodes 3, 3' (Wehnelt cylinders) and the first acceleration anode.

The color selection voltage is in the simplest case a sawtooth voltage or, better, a stepped voltage with three stages. In order to avoid overlapping, that is, simultaneous appearance of two neighboring color strips in the transition between the stages of the stepped voltage, which never takes place abruptly in a practical case, the electron beam is advantageously scanned dark. This is in simplest manner effected with the aid of a second Wehnelt electrode 3' on which is placed a sine voltage S with the threefold frequency of the color carrier. The last noted electrode must be employed in such case because different electron velocities would otherwise appear in the range of the first deflection, which would in turn effect different deflections. It is in the construction, for a good target effect with respect to the individual colors merely necessary that there obtains agreement between the divisions of the elementary group arrangement 7, the screen electrode 8 and the divisions of the Venetion blind grid (pitch), at least insofar as the average value is concerned, and that the direction of the metallic strips of the Venetian blind grid coincides with the direction of the color strips of the screen electrode 8, 7. So far as the first grid (potential plane grid 6) is concerned, only the grid wire plane must be parallel with the plane of the Venetian blind grid, that is, it need not be particularly adjusted with respect to its wires.

The nature of the invention may be more particularly explained with reference to FIG. 2. There are shown three arcuately extending metallic strips 5 of the Venetian blind grid, the grid constant of which amounts to the value *g*. They are mutually spaced so as to provide for a clearance *a* in the direction perpendicular to the picture screen plane or in the direction of the tube axis, the amount of such clearance lying, depending upon the dimension of the concave shape of the strips or blades, between $\frac{1}{10}$ and $\frac{1}{2}$ of the grid constant *g*. The radius of curvature of the strips or blades preferably is at least two grid constants *g*, as illustrated in FIG. 2. In the presence of a weakly positive potential of the grid, up to about +250 volts, the potential will rise very strongly forwardly as well as rearwardly (as seen in the direction of the electron beam), resulting in the formation in the gap, of a saddle point S*a* in the potential field, which is in the assumed case owing to the shape of the metal strips, strongly shifted, for example, to the left. As seen electron-optically, each individual gap therefore forms an individual lens, which is deformed to one side, so that a strong transverse component effects, upon overlapping of respectively corresponding rays, deflection of the major part of the entering electron beam (1–1) strongly to the left, at the same time focusing the beam. It was found in the course of extensive systematic investigations that electrons appear, as is usually the case, in the presence of negative potential on the lens electrode, that is, on the Venetian blind grid, which are irregularly deflected, resulting in considerable picturing errors.

Assuming application of a positive potential, of course, positive with respect to the cathode potential of the beam generating system, a part of the incident electron beam (1*a*–1) will practically directly impact the respective blade and release secondary electrons SE without, however, causing any disturbances so far as the picture screen is concerned. It must be considered in this connection that care is taken by appropriate selection of the potential and the spacing between the two adjacent electrodes so as to provide for a field strength at the frontal side of the Venetian blind grid which is always directed so that the released secondary electrons SE referred to before are always dissipated frontally and never toward the screen electrode. The previously noted selection of the positive potential of the Venetian blind grid results moreover in the same action which is achieved in connection with known normal individual lenses by blending out marginal electrons with the entry electrode so as to exclude, for example, aberration errors, which would require an auxiliary electrode with concomitant adjustment difficulties.

Figure 3:
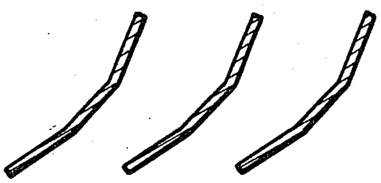
Figure 4:
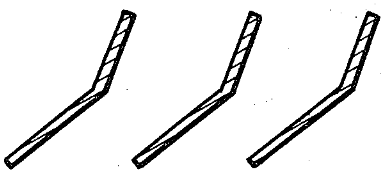

The Venetian blind grid and therewith the individual metallic strips have in view of the picture screen sizes which are at the present time customary, considerable dimensions, and particular attention must therefore be paid to avoid in operation any mechanical triggered oscillations. It is therefore necessary that the metal strips (blades) have a particularly stable shape which is in agreement with the electron-optically required shape. The blades may be shaped, aside from the arcuate shape thereof as shown in FIG. 2, as shown in FIGS. 3, 4 and 5, that is, bent once or several times, depending upon the spacing in the mechanical construction of the arrangement. The angular shape shown in FIG. 5 is particularly favorable electron-optically as well as mechanically. As initially explained, the electron beam will be projected into the Venetian blind grid in a direction normal to the picture screen. There may however be cases which demand departing from this requirement, for example, as shown in FIG. 6, in connection with flat picture tubes which have become known, wherein the beam must be deflected, for example, repeatedly, in which the invention may likewise be employed. In such a case, the entry angle $\beta$, illustrated in FIG. 6, may deviate in the line plane up to 50 degrees from the picture screen normal. Numeral 5 indicates Venetian blind blades extending in a line plane. The entry of the electron beam 2 (FIG. 1) deviates in this plane by the angle $\beta$.

An advantage of the tube according to the present invention resides, aside from the advantages flowing from a single-beam tube and the simplified production of the individual electrodes, in the absolute certainty of hitting the colors without requiring difficult adjustment work with respect to the alignment of the electrodes one with respect to the other. In the present case, and assuming that a picture screen is employed which is in customary manner subdivided into color strips, it will be necessary to adjust merely one grid with respect thereto, namely, the Venetian blind grid which exhibits the same subdivision (grid constant, pitch), such adjustment involving only an alignment with respect to the direction of the metal strips forming the blades or slats of the grid. The gaps between the blades or slats of the grid, which form electron-optical lenses, need not be aligned with respect to the elementary groups so far as the color strips are concerned, since such operatively effective alignment as well as the actual spacing from the picture screen are taken into account purely by phase selection in the application of the color selection voltage. A further considerable advantage of the tube made according to the invention, as compared with previously known tubes of similar character, resides in the fact that the operatively effective part of the electron beam is very great, remaining always constant, and that the secondary electrons formed at the grid can never reach the screen and cause disturbance thereon.

FIG. 7 illustrates the application of the invention to a flat picture tube. The beam generating system indicated generally by the numeral 3, is illustrated substantially in the same way as in FIG. 1. The deflection system indicated at the left end of the tube serves only for the vertical deflection, namely, for the selection of the respective scanning lines, while a parallel wire grid 41 is provided for the beam deflection to form the scanning lines, such grid 41 also representing the means, mentioned in claim 1, which exert a slowing down or braking action on the electrons and at the same time cause the perpendicular entry of the electrons into the Venetian blind grid plane. The beam 2, after leaving the beam generating system 3, is guided between two guide sheets 11 and 12, which are on cathode potential or a low negative potential, the guides extending along the tube to the other end thereof where the beam is deflected, by the cooperation of the deflection electrodes 13, 14 and 15, having an appropriate negative potential, into a parallel path extending in reverse direction. The beam moves along this path, parallel to the plane of the screen electrode 7, 8, the grid electrodes 5, 6 and the grid 41, thus moving perpendicularly to the longitudinal extent of the grid elements. The potential of the individual parallel wires of the brake- and deflection grid, in number proportionally corresponding to the number of lines, which wires are not electrically connected, can be made by means of a suitable control voltage, successively negative so that the electron beam 2 is slowed down and at the same time bent toward the grid electrodes 5, 6 and the screen electrode 7, 8. The passage of the electron beam through these grid electrodes and the corresponding color control may be effected as described in connection with the tube shown in FIG. 1.

Changes may be made within the scope and spirit of the appended claims which define what is believed to be new and desired to have protected by Letters Patent.

We claim:

1. In an electron tube for reproducing color television pictures, having focusing and deflection means of the kind customarily employed in connection with monochromatic picture tubes, and having disposed in an evacuated tube stem a system for producing an electron beam which can be modulated as to its intensity, and having a picture screen electrode which is connected to high voltage and provided with at least two substances adapted to luminesce in different colors responsive to electron impact thereon, said substances being disposed along discrete and regularly distributed areas which respectively represent elementary groups, and also having two mutually spaced apart grids disposed ahead of the picture screen electrode and practically parallel thereto, and further having means for causing the electrons to enter perpendicularly into the plane of the respective grids, whereby said electrons are slowed down to easily influenced slow electrons, the acceleration field of the screen electrode deflecting said electrons from their paths at the screen side and simultaneously focusing the electrons, and having color selection means for periodically affecting the acceleration of said electrons so as to cause successive picturing thereof upon the individual areas of different colors of the respective elementary groups; the improvement which is characterized by the provision of a plurality of mutually parallel disposed metallic strips which are in the fashion of slats of a Venetian blind mutually spaced apart, such spacing being in accordance with a grid constant which is equal to or smaller than the electron beam diameter, the respective metal strips being respectively bent so as to retain therebetween some clearance in the direction of the tube axis, said Venetian blind grid being one of said two mutually spaced grids and being disposed directly ahead of said screen electrode, said screen electrode being metal-backed and the areas of the respective elementary groups being provided thereon in the form of strips extending in parallel with the strips of said Venetian blind grid, the second one of said two mutually spaced apart grids being disposed directly ahead of said Venetian blind grid and serving substantially solely for causing the electrons to enter said grid planes perpendicularly, the division of said second grid being independent of the division of said Venetian blind grid and also independent of the division of said elementary groups.

2. An electron tube according to claim 1, wherein said last named second grid is, as to the division thereof in the form of a desired mesh grid.

3. An electron tube according to claim 1, wherein said metal strips of said Venetian blind grid are arcuate, and the clearance between the metal strips of said Venetian blind grid, in the direction perpendicular to the picture screen plane, is increased up to about one half grid constant with increased concavity of the respective metal strips.

4. An electron tube according to claim 1, wherein the respective metal strips of said Venetian blind grid are of arcuate shape with a radius of curvature amounting to at least two grid constants.

5. An electron tube according to claim 1, wherein the respective metal strips of said Venetian blind grid are bent to embrace a right angle.

6. An electron tube according to claim 1, wherein the spacing of said second grid from said Venetian blind grid is equal to or smaller than the spacing of the latter from the screen electrode and amounting up to 50 grid constants.

7. An electron tube according to claim 1, wherein said grids are spaced one from the other and both from said screen electrode so as to provide a field strength which is greater ahead of said Venetian blind grid than in back thereof.

8. An electron tube according to claim 1, wherein the potentials placed respectively on said grids and on said screen electrode produce a field strength which is greater ahead of said Venetian blind grid than in back thereof.

9. An electron tube according to claim 1 in which said focusing and deflecting means are constructed to form, with said grids and screen electrode, a flat picture tube structure, wherein the electron entry angle in the line plane, normal to the plane of the picture screen, of the electrons into the Venetian blind grid, has a finite value and amounts up to 50°.

10. An electron tube according to claim 1, wherein a high frequency color selection voltage is placed in common on both of said grids and on said screen electrode.

11. In an electron tube for reproducing color television pictures, comprising an electron producing system having a cathode, a control electrode and at least one acceleration electrode, and having a picture screen electrode which is connected to high voltage and provided with at least two substances adapted to luminesce in different colors responsive to electron impact thereon, said substances being disposed along discrete and regularly distributed areas which respectively represent elementary groups, and also having two mutually spaced apart grids disposed ahead of the picture screen electrode and practically parallel thereto, and further having means for causing the electrons to enter perpendicularly into the plane of the respective grids, whereby said electrons are slowed down to easily influenced slow electrons, the acceleration field of the screen electrode deflecting said electrons from their paths at the screen side and simultaneously focusing the electrons, and having color selection means for periodically affecting the acceleration of said electrons so as to cause successive picturing thereof upon the individual areas of different colors of the respective elementary groups; the improvement which is characterized by the provision of a plurality of mutually parallel disposed metallic strips which are in the fashion of slats of a Venetian blind mutually spaced apart, such spacing being in accordance with a grid constant which is equal to or smaller than the electron beam diameter, the respective metal strips being respectively bent so as to retain therebetween some clearance in the direction of the tube axis, said Venetian blind grid being one of said two mutually spaced grids and being disposed directly ahead of said screen electrode, said screen electrode being metal-backed and the areas of the respective elementary groups being provided thereon in the form of strips extending in parallel with the strips of said Venetian blind grid, the second one of said two mutually spaced apart grids being disposed directly ahead of said Venetian blind grid and serving substantially solely for causing the electrons to enter said grid planes perpendicularly, the division of said second grid being independent of the division of said Venetian blind grid and also independent of the division of said elementary groups, said Venetian blind grid having a potential applied thereto which is with respect to the potential of the cathode of the electron producing system always positive and amounts up to 250 volts.

12. In an electron tube for reproducing color television pictures, comprising an electron producing system having a cathode, a control electrode and at least one acceleration electrode, and having a picture screen electrode which is connected to high voltage and provided with at least two substances adapted to luminesce in different colors responsive to electron impact thereon, said substances being disposed along discrete and regularly distributed areas which respectively represent elementary groups, and also having two mutually spaced apart grids disposed ahead of the picture screen electrode and practically parallel thereto, and further having means for causing the electrons to enter perpendicularly into the plane of the receptive grids, whereby said electrons are slowed down to easily influenced slow electrons, the acceleration field of the screen electrode deflecting said electrons from their paths at the screen side and simultaneously focusing the electrons, and having color selection means for periodically affecting the acceleration of said electrons so as to cause successive picturing thereof upon the individual areas of different colors of the respective elementary groups; the improvement which is characterized by the provision of a plurality of mutually parallel disposed metallic strips which are in the fashion of slats of a Venetian blind mutually spaced apart, such spacing being in accordance with a grid constant which is equal to or smaller than the electron beam diameter, the respective metal strips being respectively bent so as to retain therebetween some clearance in the direction of the tube axis, said Venetian blind grid being one of said two mutually spaced grids and being disposed directly ahead of said screen electrode, said screen electrode being metal-backed and the areas of the responsive elementary groups being provided thereon in the form of strips extending in parallel with the strips of said Venetian blind grid, the second one of said two mutually spaced apart grids being disposed directly ahead of said Venetian blind grid and serving substantially solely for causing the electrons to enter said grid planes perpendicularly, the division of said second grid being independent of the division of said Venetian blind grid and also independent of the division of said elementary groups, and means for placing a high frequency color selection voltage in common on the cathode, the control electrode, and the acceleration electrode of the electron producing system.

13. In an electron tube for reproducing color television pictures, comprising an electron producing system maving a cathode, a Wehnelt control electrode and at least one acceleration electrode, and having a picture screen electrode which is connected to high voltage and provided with at least two substances adapted to luminesce in different colors responsive to electron impact thereon, said substances being disposed along discrete and regularly distributed areas which respectively represent elementary groups, and also having two mutually spaced apart grids disposed ahead of the picture screen electrode and practically parallel thereto, and further having means for causing the electrons to enter perpendicularly into the plane of the respective grids, whereby said electrons are slowed down to easily influenced slow electrons, the acceleration field of the screen electrode deflecting said electrons from their paths at the screen side and simultaneously focusing the electrons, and having color selection means for periodically affecting the acceleration of said electrons so as to cause successive picturing thereof upon the individual areas of different colors of the respective elementary groups; the improvement which is characterized by the provision of a plurality of mutually parallel disposed metallic strips which are in the fashion of slats of a Venetian blind mutually spaced apart, such spacing being in accordance with a grid constant which is equal to or smaller than the electron beam diameter, the respec- Sept. 8, 1964 H. H. LOCKHART 3,148,343

VARIABLE ULTRASONIC DELAY LINE

Filed May 31, 1961 2 Sheets-Sheet 1

INVENTOR.
HARRY H. LOCKHART
BY
Philip J. McFarland
ATTORNEY